US006388246B1

(12) United States Patent
Fry et al.

(10) Patent No.: US 6,388,246 B1
(45) Date of Patent: May 14, 2002

(54) SYSTEM AND METHOD FOR DETECTING UNDERWATER OBJECTS HAVING A SHIFTED FREQUENCY

(75) Inventors: Edward S. Fry; George W. Kattawar, both of College Station; Thomas Walther, Bryan, all of TX (US); Xioajiang Pan, San Diego, CA (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 09/491,943

(22) Filed: Jan. 26, 2000

Related U.S. Application Data

(60) Provisional application No. 60/117,484, filed on Jan. 27, 1999.

(51) Int. Cl.[7] .................................................. H01J 40/14

(52) U.S. Cl. ........................................ 250/221; 250/574
(58) Field of Search ............................... 250/221, 222.2, 250/222.1, 574; 356/432, 441; 340/555–557, 850

(56) References Cited

U.S. PATENT DOCUMENTS 4,203,108 A * 5/1980 Eknayan ..................... 340/850

OTHER PUBLICATIONS

S. W. Henderson, E.H. Yuen, E.S. Fry, "Fast Resonance–Detection Tech. for Single–Freq. Operation of Injection–Seeded Nd–YAG Lasers," Opt. Lett. vol. 11, pp. 715–717 (1986). (Month Unknown).

E.S. Fry, Q. Hu, and X. Li, "Single–Frequency Operation of an Injection–Seeded Nd:YAG Laser in High Noise and Vibration Environments," Appl. Opt. vol. 30, pp. 1015–1017 (1990). (Month Unknown).

D.J. Dick and T.M. Shay, "Ultrahigh–Noise Rejection Optical Filter," Opt. Lett. vol. 16, pp. 867–869 (1991). (Month Unknown).

R.I. Billmers, S.K. Gayen, et al., Experimental Demonstration of an Excited–State Faraday Filter Operating at 532 nm, Opt. Lett. vol. 20, pp. 106–108 (1995). (Month Unknown).

J. Menders, K. Benson, et al., "Ultranarrow Line Filtering Using a Cs Faraday Filter at 852 nm," Opt. Let. vol. 16, pp. 846–848 (1991). (Month Unknown).

T.M. Shay and B. Yin, "Faraday Anomalous Dispersion Optical Filters," Proceedings of the International Conference on Lasers '91, pp. 641–648 (1991). (Month Unknown).

Y. Emery and E.S. Fry, "Lab. Develop. of a Lidar for Measurement of Sound Velocity in the Ocean Using Brillouin Scatt.," in *Ocean Optics XIII*, Proc. SPIE vol. 2963, pp. 210–215 (1997). (Month Unknown).

E.S. Fry, Y. Emery, X. Quan, and J. Katz, "Accuracy Limitations On Brillouin Lidar Measurements of Temperature and Sound Speed in the Ocean," accepted in Jul. by Applied Optics, vol. 36, pp. 6887–6894, (1997). (Month Unknown).

(List continued on next page.)

Primary Examiner—Que T. Le
(74) Attorney, Agent, or Firm—Baker Botts L.L.P.

(57) ABSTRACT

A system for detecting an underwater object includes an optical signal generator operable to generate and transmit an optical signal into the water. The system also includes an absorption cell operable to receive the optical signal reflected from the water and absorb an unshifted frequency component of the reflected optical signal. The system further includes a detector operable to receive a shifted frequency component of the optical signal from the absorption cell and detect the object using the shifted frequency component of the optical signal. Displacement of the water by the object causes an absence of a portion of the shifted frequency component of the optical signal.

20 Claims, 3 Drawing Sheets

OTHER PUBLICATIONS

B.D. Joelson and G.W. Kattawar, "Multiple Scattering Effects in LIDAR Spectroscopy," in *Laser Remote Sensing of Natural Waters*, Proc. SPIE vol. 2964, pp. 202–214 (1996).(Month Unknown).

G. D. Hickman, J. M. Harding, M. Carnes, A. Pressman, G. W. Kattawar, and E. S. Fry, "Aircraft Laser Sensing of Sound Velocity in Water: Brillouin Scattering," Remote Sens. Environ., vol. 36, pp. 165–178, (1991).(Month Unknown).

J.L. Guagliardo and H. L. Dufilho, "Range–Resolved Brillouin Scattering Using A Pulsed Laser," Rev. Sci. Instrum., vol. 51, pp. 79–81, (1980).(Month Unknown).

D. A. Leonard and B. Caputo, "Remote sensing of the Ocean Mixed–Layer Depth," Optical Engineering, vol. 22, No. 3, pp. 288–291, (1983). (Month Unknown).

D. J. Collins, J. A. Bell, R. Zaoni, I. S. McDermid, J. B. Breckinridge, and C. A. Sepulveda, "Recent Progress in the Measurement of Temperature and Salinity by Optical Scattering," Ocean Optics VII, vol. 489, pp. 247–263 (Proc. SPIE, 1984) (Month Unknown).

A. T. Young, "Rayleigh Scattering," Physics Today, vol. 35, No. 1, pp. 42–48 (1982).(Month Unknown).

"Oceanographic Station Profile Time Series," National Oceanographic Data Center (NODC), User Services Branch, NOAA/NESDIS E/OC21, Washington, D.C., (1993).(Month Unknown).

C. L. Korb, B. M. Gentry, and C. Y. Weng, "Edge Technique: Theory and Application to the Lidar Measurment of Atmospheric Wind," Applied Optics, vol. 31, No. 21, pp. 4202–4213 (1992).(Month Unknown).

R. Y. Chiao and B. P. Stoicheff, "Brillouin Scattering in Liquids Excited by the He–Ne Maser," Journal of the Optical Society of America, vol. 54, pp. 1286–1287, (1964).(Month Unknown).

G. B. Bendek, J. B. Lastovka, K. Fritsch, and T. Greytak, "Brillouin Scattering in Liquids and Solids Using Low –Power Laswers," Journal of the Optical Society of America, vol. 54, pp. 1284–1285, (1964).(Month Unknown).

D. A. Leonard and H. E. Sweeney, "Remote Sensing of Ocean Physical Properties: A Comparison of Raman and Brillouin Techniques," Ocean Optics IX, Proc. SPIE, vol. 925, pp. 407–414, (1988).(Month Unknown).

H.Z. Cummins and R. W. Gammon, "Rayleigh and Brillouin Scattering in Liquids: The Landau–Placzek Ratio," J. Chem. Phys., vol. 44, pp. 2787–2796, (1966).(Month Unknown).

J. G. Hirschberg and J. D. Byrne, "Rapid Underwater Ocean Measurement Using Brillouin Scattering," Ocean Optics VII, Proc. SPIE, vol. 489, pp. 270–276, (1984).(Month Unknown).

J. Forkey, W. R. Lempert, and R. B. Miles, "Flow Field Diagnostics by Spectrally Filtered Rayleigh Scattering," Proc. SPIE, vol. 1602, pp. 111–120, (1990).(Month Unknown).

P. Piironen and E. W. Eloranta, "Demonstration of a High –Spectral–Resolution Lidar Based on an Iodine Absorption Filter," Optics Letters, vol. 19, No. 3, pp. 234–236, (1994).(Month Unknown).

R. I. Billers, S. K. Gayen, M. F. Squicciarini, V. M. Contarino, W. J. Scharpf, and D. M. Allocca, "Experimental Demonstration of an Excited–State Faraday Filter Operating at 532 nm," Optics Letters, vol. 20, pp. 106–108, (1995). (Month Unknown).

R. Billmers and V. M. Contarino,"An Optical Filter for Underwater Communications," NASA Tech Briefs 21, 12a (1995). (Month Unknown).

C.D. Mobley, "Light and Water, Radiative Transfer in Natural Water," (Academic Press, New York, 1994),pp. 214–215. (Month Unknown).

L. J. Mullen, P.R. Herezfed, and V. M. Contarino, "Progress in Hybrid Lidar–Radar for Ocean Exploration," Sea Technology 37, 45–48 (1996).(Month Unknown).

D.A. Leonard and H. E. Sweeney, "A Comparison of Stimulated and Spontaneous Laser Radar Methods for the Remote Sensing of Ocean Physical Properties," Ocean Optics X, Proc. SPIE, vol. 1302, pp. 568–582 (1990).(Month Unknown).

E. S. Fry, "Brillouin LIDAR Receiver Based on Edges of Absorption Lines of $I_2$ and $Br_2$," Texas A&M University Internal Report, pp. 1–20 (1992).(Month Unknown).

V.A. Del Grosso, "New Equation for the Speed of Sound in Natural Waters (with Comparisons to Other Equations)," J. Acoust. Soc. Am., vol. 56, No. 4, pp. 1084–1091 (1974).(Month Unknown).

* cited by examiner

SYSTEM AND METHOD FOR DETECTING UNDERWATER OBJECTS HAVING A SHIFTED FREQUENCY

RELATED APPLICATIONS

This application claims the benefit of serial number 60/117,484, entitled "Apparatus and Method for Detecting Underwater Ojbects," filed provisionally on Jan. 27, 1999.

GOVERNMENT RIGHTS

This invention was made with Government support under Contract No N00014-96-1-0410 awarded by the department of the Navy. The government has certain rights in this invention.

TECHNICAL FIELD OF THE INVENTION

This invention relates generally to the field of detection systems, and more particularly, to a system and method for detecting underwater objects.

BACKGROUND OF THE INVENTION

Detection systems are generally used to locate and/or identify objects in a variety of media. For example, underwater detection systems are generally used to detect objects submerged in water. Underwater detection systems generally include a variety of applications, such as commercial, military and recreational. For example, recreational and commercial applications for underwater detection systems may include aquatic animal locating and underwater terrain mapping. Military applications for underwater detection systems may include mine sweeping and/or underwater vessel detection.

One type of underwater detection system is a sonar system. In sonar systems, sound waves are generated and transmitted through the water. The sound waves are reflected by objects submerged in the water. The reflected sound waves are generally analyzed to detect and identify objects submerged in the water. Another type of underwater detection system is a lidar or light detection and ranging system. In a lidar system, a laser transmits pulses of light energy into the water at a predetermined frequency from a generally remote vehicle. Backscattered light energy reflected by the water is generally analyzed to detect the presence of objects submerged in the water.

However, conventional underwater detection systems suffer several disadvantages. For example, sound-based underwater detection systems generally provide inadequate resolution for identifying the underwater object. In lidar systems, optical clutter resulting from generally large amounts of spurious light scattering, such as from water surface reflections, substantially inhibits object detection near the surface of the water. Additionally, because daylight conditions generally produce a large optical background, object contrast is substantially impaired during daylight conditions.

SUMMARY OF THE INVENTION

Accordingly, a need has arisen for an improved underwater detection system and method that provides increased resolution and greater accuracy. The present invention provides a system and method for detecting underwater objects that addresses shortcomings of prior systems and methods.

According to one embodiment of the present invention, a system for detecting an underwater object comprises an optical signal generator operable to generate and transmit an optical signal into the water. The system also includes an absorption cell operable to receive the optical signal reflected from the water and absorb an unshifted frequency component of the reflected optical signal. The system further includes a detector operable to receive a shifted frequency component of the optical signal from the absorption cell to detect the object. Displacement of the water by the object causes an absence of a portion of the shifted frequency component of the optical signal.

According to another embodiment of the present invention, a method for detecting an underwater object comprises generating an optical signal using an optical signal generator and transmitting the optical signal into the water. The method also includes receiving the optical signal reflected from the water at an absorption cell. The method also includes absorbing an unshifted frequency component of the optical signal using the absorption cell and transmitting a shifted frequency component of the optical signal to a detector. The method further includes detecting the object in the water using the shifted frequency component of the optical signal. Displacement of the water by the object causes an absence of a portion of the shifted frequency portion of the optical signal.

The present invention provides several technical advantages. For example, according to one embodiment of the present invention, the system provides detection of submerged objects independent of the composition of the object. For example, the shifted frequency component of the optical signal reflected from the water is received at the detector. Water displacement caused by the object causes an absence of a portion of the shifted frequency component of the optical signal. Thus, detection of the object is independent of the composition of the object.

Another technical advantage of the present invention includes a detection signal that is generally free of background signals. For example, in turbid water, backscattered energy of the optical signal caused by suspended particles, the submerged object and the sea floor is generally unshifted from a predetermined generated frequency and is removed using the absorption cell. Thus, only the shifted frequency component of the optical signal is received at the detector. Therefore, the shifted frequency component of the optical signal provides a generally definitive detection signal.

Other technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE INVENTION

Figure 1:
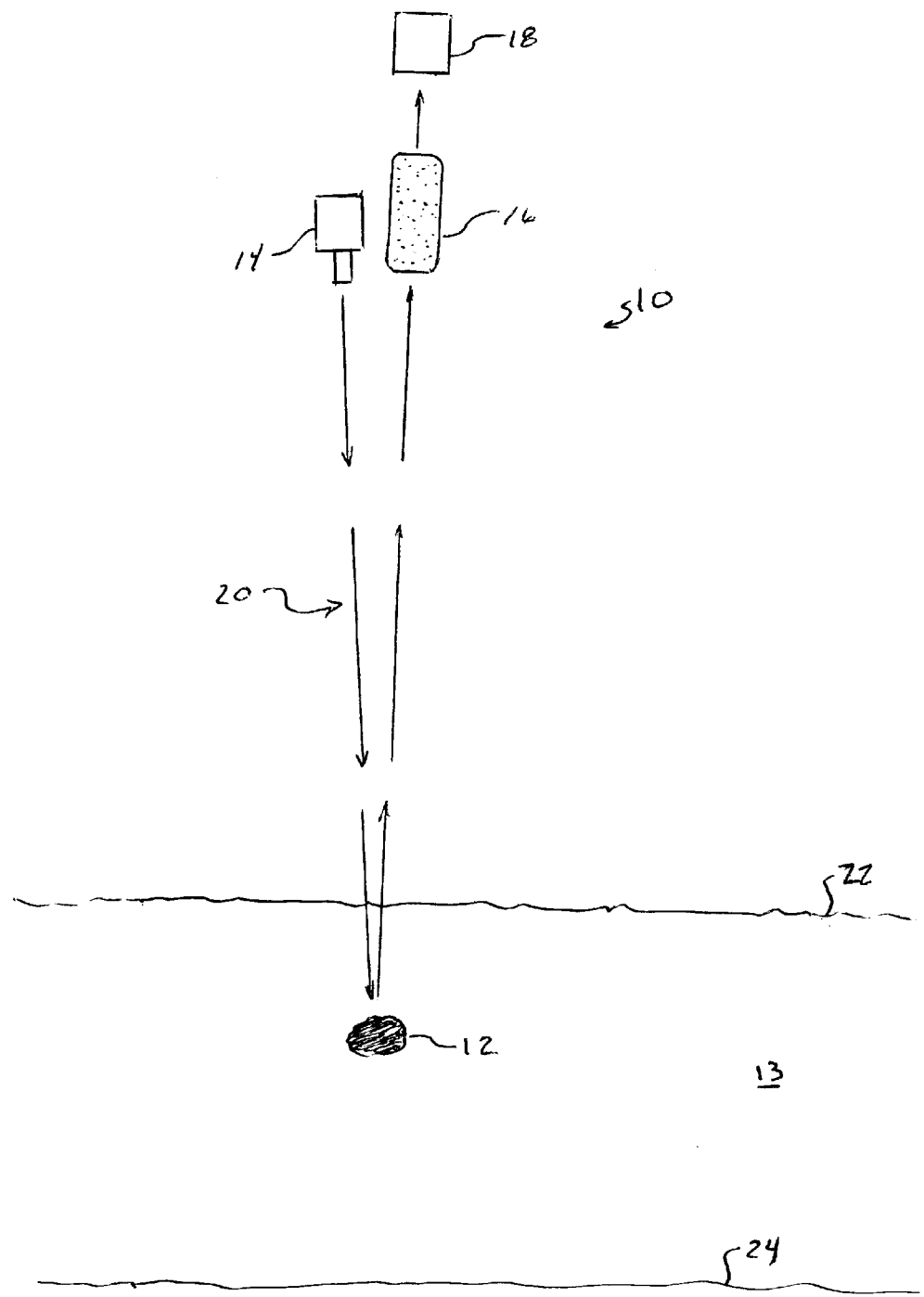
FIG. 1 is a diagram illustrating a system for detecting an underwater object in accordance with an embodiment of the present invention.

FIG. 1 is a diagram illustrating a system 10 for detecting an object 12 submerged in water 13 in accordance with an embodiment of the present invention. In the embodiment illustrated in FIG. 1, system 10 comprises an optical signal generator 14, an absorption cell 16 and a detector 18. Briefly, optical signal generator 14 generates and transmits an optical signal, indicated generally at 20, into the water 13. The backscattered energy of the optical signal 20 reflected by the water 13 is received at absorption cell 16. Absorption cell 16 removes an unshifted frequency component of the optical signal 20 and transmits a shifted frequency component of the optical signal 20 to detector 18. Using the shifted frequency component of the optical signal 20, detector 18 is used to detect object 12 by the disappearance or absence of a portion of the shifted frequency component of the optical signal 20. The absence of a portion of the shifted frequency component of the optical signal 20 is generally caused by displacement of the water 13 caused by the submerged object 12.

Optical signal generator 14 may comprise a laser having a generally narrow line width and generally high stability. For example, in one embodiment of the present invention, a frequency doubled, injection locked, pulsed Nd:YAG laser may be used to generate and transmit the optical signals 20 into the water 13. Optical signal generator 14 may be located on a ship, submarine, aircraft, or other suitable vehicle to generate the optical signals 20 and transmit the optical signals 20 into the water 13. Thus, optical signal generator 14 generates a generally stable optical signal 20 at a predetermined frequency. In one embodiment of the present invention, the pulsed laser optical signals 20 transmitted by optical signal generator 14 may be generated at a wavelength of 532 nanometers. However, other suitable wavelengths may be used for the optical signals 20.

The backscattered energy of the optical signals 20 caused by the water 13 generally includes a frequency spectrum comprising an elastic component at the predetermined frequency of the generated optical signal 20 and an inelastic component Brillouin shifted from the predetermined frequency of the generated optical signal 20. For example, backscattered energy of the optical signals 20 caused by reflection by a surface 22 of the water 13, suspended particles in the water 13, the submerged object 12, and the sea floor 24 is elastically scattered and remains generally at the predetermined frequency of the generated optical signals 20. The Brillouin shifted inelastic component of the backscattered energy caused by the water 13 is generally absent at the location of object 12 because of displacement of the water 13 by object 12. For example, for optical signals 20 generated at a wavelength of 532 nanometers, the inelastic component of the optical signals is Brillouin shifted approximately seven to eight GHz in typical oceans and fresh water lakes.

Absorption cell 16 comprises a molecular composition for absorbing the unshifted frequency component of the optical signal 20. For example, the predetermined frequency of the generated optical signals 20 and a molecular and/or atomic absorption line of absorption cell 16 are selected to correspond with each other such that the unshifted frequency portion of the optical signal 20 is absorbed by absorption cell 16. Thus, the backscattered energy of the optical signals 20 caused by reflection by the surface 22 of the water 13, suspended particles in the water 13, the submerged object 12, and the sea floor 24 is absorbed by absorption cell 16. The Brillouin shifted component of the optical signals 20 is transmitted by absorption cell 16 to detector 18.

In accordance with one embodiment of the present invention, absorption cell 16 may comprise an Iodine or Bromine absorption cell 16. However, other suitable molecular compositions may be used in absorption cell 16. The predetermined frequency of the optical signals 20 generated by optical signal generator 14 are selected to correspond with an absorption line of the Iodine or Bromine absorption cell 16. Thus, the backscattered light energy of the optical signals 20 having a Brillouin shifted frequency is transmitted by the Iodine or Bromine absorption cell 16 to detector 18.

Detector 18 may comprise a charge coupled device, a digital camera, an oscilloscope, or other suitable device for receiving and displaying the Brillouin shifted frequency component of the optical signals 20 received from absorption cell 16. Thus, the Brillouin shifted frequency component of the optical signal 20 is displayed on detector 18 such that an object 12 submerged in the water 13 generally appears as a dark area in a bright field. For example, the absence or disappearance of the Brillouin shifted frequency component of the displayed optical signal 20 is generally caused by the displacement of the water 13 by the object 12. Therefore, the signature of the presence of object 12 is generally the disappearance of a portion of the Brillouin shifted frequency component of the optical signal 20 caused by displacement of the water 13 by object 12. Thus, detection of object 12 is independent of the composition of object 12.

System 10 may also be used to determine a depth of object 12 within the water 13. For example, as described above, optical generator 14 may comprise a pulsed laser to generate and transmit time-based optical signals 20 into the water. The backscattered energy of the reflected optical signals 20 may be recorded as a function of the return time of the optical signal 20 at detector 18.

Figure 2:
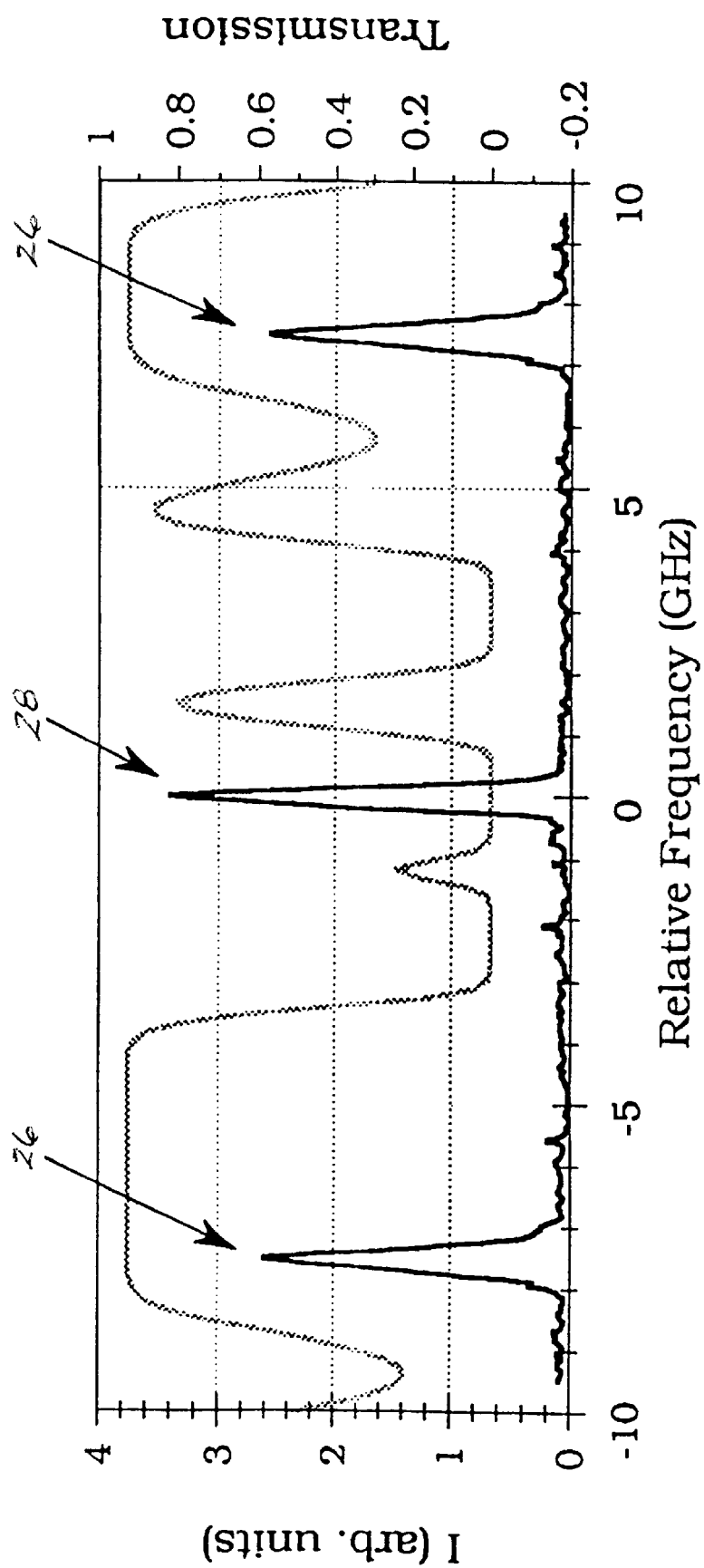
FIG. 2 is a diagram illustrating an exemplary measurement of Brillouin scattering of optical signals in accordance with an embodiment of the present invention.

FIG. 2 is a diagram illustrating an exemplary interplay between an absorption cell 16 frequency spectrum and Brillouin shifted scattering of the optical signals 20 in accordance with an embodiment of the present invention. In the embodiment illustrated in FIG. 2, absorption cell 16 comprises an Iodine absorption cell 16. As illustrated in FIG. 2, two inelastic Brillouin shifted frequency components are displayed, indicated generally at 26, and a central elastic frequency component is displayed, indicated generally at 28. The central elastic frequency component 28 comprises the frequency of the generated optical signals 20 due to scattering by suspended particles or generally the reflection of objects 12 in the water 13. The predetermined frequency of the optical signals 20 generated by optical signal generator 14 is selected to lie in the middle of an absorption line of the Iodine absorption cell 16. The absorption line may be chosen such that the frequency spectrum also comprises simultaneous transmission windows for backward and forward Brillouin shifted components.

Figure 3:
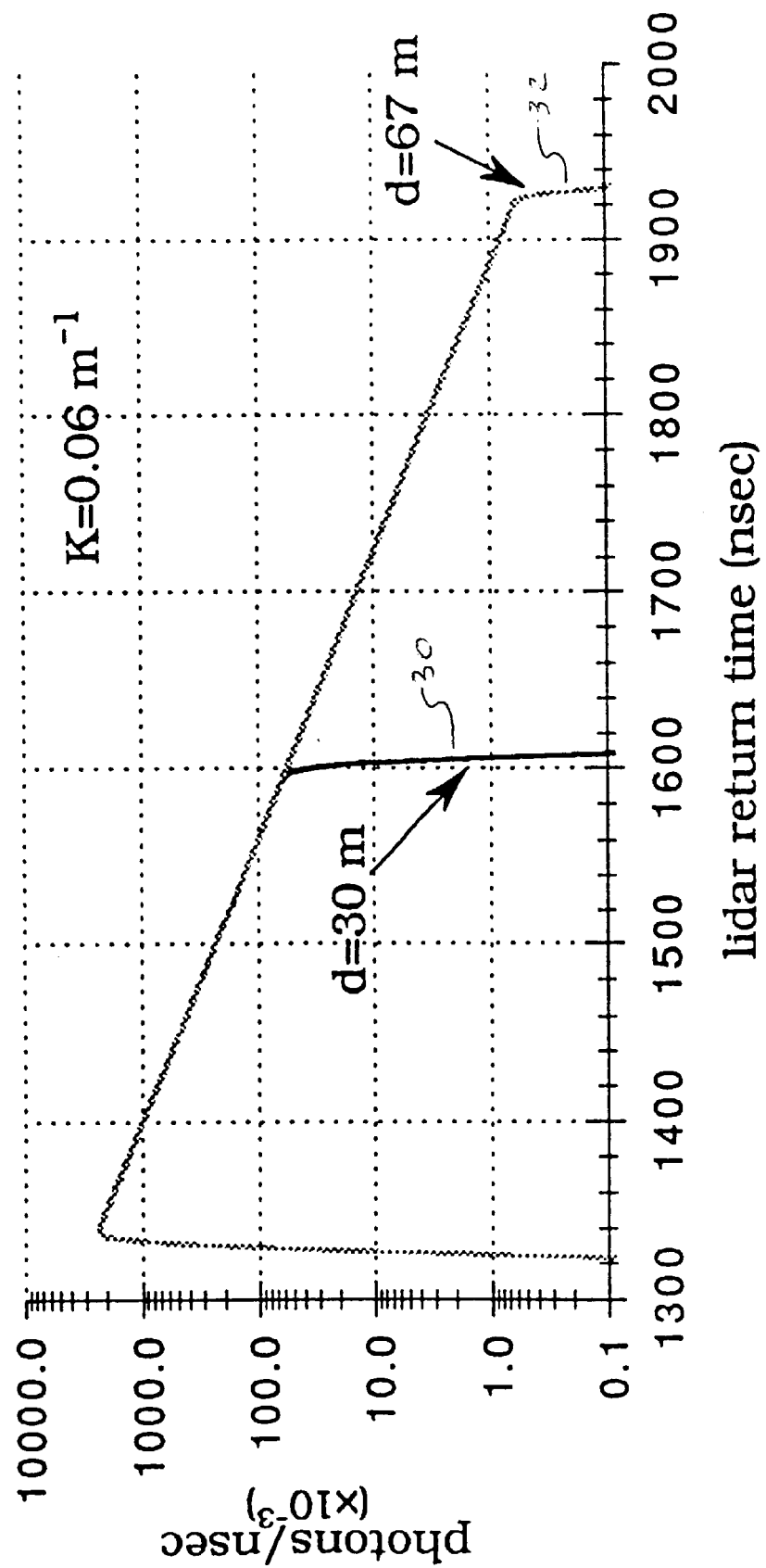
FIG. 3 is a diagram illustrating depth detection of the object as a function of optical signal return time in accordance with an embodiment of the present invention.

FIG. 3 is a diagram illustrating a shifted frequency component of the optical signals 20 as a function of the return time of the optical signals 20 in accordance with an embodiment of the present invention. In the embodiment illustrated in FIG. 3, optical signal generator 14 is disposed approximately 200 meters above surface 22 of the water 13 and generates the optical signals 20 with a pulse energy level of approximately five microjules and a pulse width of approximately six nanoseconds. Detector 18 comprises an energy receiving area of approximately ⅓ square meter. The value K represents the diffusion attenuation coefficient of the water 13 due to absorption and scattering.

As illustrated in FIG. 3, the curves correspond to an object 12 or the sea floor 24 at a depth of thirty meters, indicated generally at 30, and at sixty-seven meters, indicated generally at 32, respectively. The backscattered energy of the shifted frequency optical signals 20 generally disappears at a submerged object 12. As described above, the optical signals 20 may be generated at a wavelength of 532 nanometers. At a wavelength of 532 nanometers, the Brillouin shifted frequency component of the optical signals 20 generally varies from 0.0 to approximately 7.5 GHz as the scattering angle varies from 0° to 180°. Thus, substantially all of the photons arise from a single Brillouin backscattering at a generally well-defined depth. For example, a photon that is Brillouin scattered in a forward direction then back-scattered by a hydrosol or the sea floor 24 generally does not contribute to the inelastic component of the optical signal 20 because the frequency of the optical signal 20 has not been shifted.

For example, as illustrated in FIG. 3, the optical signal 20 decreases exponentially with depth and abruptly decreases to approximately zero when object 12 or the sea floor 24 is encountered. If object 12 is generally smaller than the footprint of the optical signal 20 at the depth of the object 12, the optical signal 20 abruptly decreases to a value proportional to a fraction of the optical signal 20 that is not obstructed.

Therefore, the present invention provides greater accuracy and resolution of underwater objects 12 than prior systems and methods by using Brillouin shifted frequency components of the optical signals 20 transmitted through the water 13. For example, objects 12 near or at the surface 22 of the water 13 are readily detectable because unshifted frequency components of the reflected optical signals 20 are removed using absorption cell 16. Additionally, system 10 provides detection of underwater objects 12 independently of the composition of the objects 12.

Although the present invention has been described in detail, it should be understood that various changes, substitutions, and alterations can be made therein without departing from the spirit and scope of the present invention as defined by the appended claims.

What is claimed is:

1. A system for detecting an underwater object, comprising:
    an optical signal generator operable to generate and transmit an optical signal into the water;
    an absorption cell operable to receive the optical signal reflected from the water and absorb an unshifted frequency component of the reflected optical signal; and
    a detector operable to receive a shifted frequency component of the optical signal from the absorption cell and detect the object using the shifted frequency component of the optical signal, wherein displacement of the water by the object causes an absence of a portion of the shifted frequency component of the optical signal.

2. The system of claim 1, wherein the optical signal generator comprises a laser.

3. The system of claim 2, wherein the laser comprises a Nd:YAG laser.

4. The system of claim 1, wherein the optical signal generator comprises a pulse laser, and wherein the detector is further operable to determine a depth of the object in the water using a return time of the reflected optical signal.

5. The system of claim 1, wherein the absorption cell comprises an Iodine absorption cell.

6. The system of claim 1, wherein the optical signal generator is operable to generate the optical signal at a predetermined frequency, the predetermined frequency corresponding with an absorption line of the absorption cell.

7. The system of claim 1, wherein the detector comprises a digital camera.

8. The system of claim 1, wherein the optical signal generator is operable to generate the optical signals at a predetermined frequency, the predetermined frequency corresponding to an absorption line of the absorption cell, and wherein the absorption line is selected such that a frequency spectrum of the optical signals comprises a forward and a backward shifted frequency component.

9. A method for detecting an underwater object, comprising:
    generating an optical signal using an optical signal generator;
    transmitting the optical signal into the water;
    receiving the optical signal reflected from the water at an absorption cell;
    absorbing an unshifted frequency component of the optical signal using the absorption cell;
    transmitting a shifted frequency component of the optical signal to a detector; and
    detecting the object in the water using the shifted frequency component of the optical signal, wherein displacement of the water by the object causes an absence of a portion of the shifted frequency component of the optical signal.

10. The method of claim 9, wherein generating the optical signal comprises generating the optical signal using a laser.

11. The method of claim 9, wherein absorbing the unshifted frequency component of the optical signal comprises absorbing the unshifted frequency component of the optical signal using an Iodine absorption cell.

12. The method of claim 9, wherein detecting the object comprises detecting the object using a charge coupled device.

13. The method of claim 9, wherein generating the optical signal comprises generating the optical signal using a pulse laser.

14. The method of claim 13, further comprising determining a depth of the object in the water using the detector and a return time of the reflected optical signal.

15. The method of claim 9, wherein generating the optical signal comprises generating the optical signal at a predetermined frequency, the predetermined frequency corresponding to an absorption line of the absorption cell.

16. A system for detecting an underwater object, comprising;
    an optical signal generator operable to transmit an optical signal into the water;
    an absorption cell operable to receive the optical signal reflected by the water, the reflected optical signal having an unshifted frequency component and a Brillouin shifted frequency component, the absorption cell operable to absorb the unshifted frequency component of the reflected optical signal; and
    a detector operable to receive the Brillouin shifted frequency component of the reflected optical signal from the absorption cell and display the Brillouin shifted frequency component of the reflected optical signal, and wherein an absence of a portion of the Brillouin shifted frequency component of the reflected optical signal indicates displacement of the water by the object.

17. The system of claim 16, wherein the optical signal generator is further operable to generate time-based pulses of optical signals, and wherein the detector is further operable to determine a depth of the object using a return time of the time-based pulses.

18. The system of claim 16, wherein the optical generator is operable to generate the optical signal at a predetermined frequency, the predetermined frequency corresponding to an absorption line of the absorption cell.

19. The system of claim 16, wherein the absorption cell comprises an Iodine absorption cell, and wherein the optical signal generator is operable to generate the optical signals at a frequency corresponding to an absorption line of the Iodine absorption cell.

20. The system of claim 16, wherein the optical signal generator is operable to generate the optical signals at a predetermined frequency, the predetermined frequency corresponding to an absorption line of the absorption cell, and wherein the absorption line is selected such that a frequency spectrum of the optical signals comprises forward and backward shifted Brillouin frequency components.

* * * * *

UNITED STATES PATENT AND TRADEMARK OFFICE
CERTIFICATE OF CORRECTION

PATENT NO.    : 6,388,246 B1
DATED         : May 14, 2002
INVENTOR(S)   : Edward S. Fry It is certified that error appears in the above-identified patent and that said Letters Patent is hereby corrected as shown below:

Title page,
Item [56], OTHER PUBLICATIONS,
After "Power", delete "Laswers," and insert -- Lasers, --
After "Remote", delete "sensing" and insert -- Sensing --.
After "Lines of", delete "$I_2$and" and insert -- $I_2$ and --.
Insert -- J. G. Hirshberg, J. D. Byrne, A. W. Wouters and G. C. Boynton, "Speed of Sound and Temperature in the Ocean by Brill and Scattering," Applied Optics, Vol. 23, pp. 2624-2628, (1984). --

Column 1,
Line 9, after "Underwater", delete "Ojbects," and insert -- Objects, --.

Column 4,
Line 59, after "five", delete "microjules" and insert -- microJules --.

Signed and Sealed this

Eighth Day of October, 2002

Attest:

JAMES E. ROGAN
Attesting Officer    Director of the United States Patent and Trademark Office